United States Patent
Bell et al.

(10) Patent No.: US 9,275,066 B2
(45) Date of Patent: Mar. 1, 2016

(54) MEDIA FILE REPLACEMENT

(71) Applicant: International Business Machines Corporation, Armonk, NY (US)

(72) Inventors: Denise A. Bell, Austin, TX (US); Pamela F. Geiger, Apex, NC (US); Leah A. Lawrence, Austin, TX (US); Irgelkha D. Mejia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 13/970,816

(22) Filed: Aug. 20, 2013

(65) Prior Publication Data
US 2015/0058284 A1 Feb. 26, 2015

(51) Int. Cl.
*G06F 17/30* (2006.01)

(52) U.S. Cl.
CPC ...... *G06F 17/3015* (2013.01); *G06F 17/30038* (2013.01)

(58) Field of Classification Search
CPC combination set(s) only.
See application file for complete search history.

(56) References Cited

U.S. PATENT DOCUMENTS

| | | | |
|---|---|---|---|
| 7,321,919 B2 | 1/2008 | Jacobs et al. | |
| 2004/0220791 A1 | 11/2004 | Lamkin et al. | |
| 2010/0205285 A1 | 8/2010 | Abbazia, Jr. et al. | |
| 2010/0225811 A1 | 9/2010 | Konvisser | |
| 2011/0069179 A1 | 3/2011 | Bathiche et al. | |
| 2011/0255132 A1* | 10/2011 | Shimada | 358/1.15 |
| 2012/0082401 A1 | 4/2012 | Berger et al. | |
| 2012/0188382 A1 | 7/2012 | Morrison et al. | |
| 2012/0213404 A1 | 8/2012 | Steiner | |

OTHER PUBLICATIONS

Google-Latlong, "Visit global landmarks with photo tours in Google Maps" Copyright 2008 Google Inc. [online], [retrieved on Mar. 15, 2013]. Retrieved from the Internet <URL: http://google-latlong.blogspot.com/2012/04/visit-global-landmarks-with-photo-tours.html>.
Derrick Harris, "IBM Targets the Future of Social Media Analytics" Apr. 28, 2011 [online], [retrieved on Mar. 15, 2013]. Retrieved from the Internet <URL: http://gigaom.com/2011/04/28/ibm-targets-the-future-of-social-media-analytics/>.
Jeffrey Kontur, "How to Choose Your Best Photo in a Series—Every Time" Dec. 7, 2010 [online], [retrieved on Mar. 15, 2013]. Retrieved from the Internet <URL: http://photo.tutsplus.com/tutorials/composition/how-to-choose-your-best-photo-in-a-series-every-time/>.
Jolie O'Dell, "Twitpic Lets You Group Photos by Event" Jun. 1, 2010 [online], [retrieved on Mar. 15, 2013]. Retrieved from the Internet <URL: http://mashable.com/2010/06/01/twitpic-events/>.

* cited by examiner

*Primary Examiner* — Etienne Leroux
(74) *Attorney, Agent, or Firm* — Jason H. Sosa; William H. Hartwell

(57) ABSTRACT

The computer manages media content by receiving, at a first memory storage location, a first file having one or more associated properties. The computer identifies a second file, at a second memory storage location, having one or more associated properties that are substantially similar to the first file. The computer compares the one or more properties of the first file to the one or more properties of the second file. The computer determines whether to replace the first file with the second file, based on the comparison of the one or more properties of the first file to the one or more properties of the second file. Responsive to determining to replace the first file with the second file, the computer stores at the first memory storage location a link to the second memory storage location.

15 Claims, 4 Drawing Sheets

MEDIA FILE REPLACEMENT

FIELD OF THE INVENTION

The present invention relates generally to the field of media file storage service and more particularly to replacing media files according to a criteria.

BACKGROUND OF THE INVENTION

Presently, the amount of digital media content publicly available is immeasurable due to the large amount of digital media content being created each day. Digital media content can include image files, music files, and video files. Digital media content often include metadata detailing properties associated with the content. Such properties can include file quality, file size, and file creation time and date.

Such digital media content can be publicly available to users through a number of ways. For example, a user can share an image file by uploading the image to a social networking website. Typically, the social networking website can have a collection of servers dedicated to storing image files that users upload to the social networking website. The uploading of images files to the social networking website over time increases the amount of storage required to store all the image files. However, as an image file is uploaded to the social networking website, there can be a similar image to the image file being uploaded already stored in the collection of servers. For example, the image could have been taken at the same location, at the same event, and/or of the same person. In some instances, the similar image can be superior to the image being uploaded. Even though the similar image exists, the user uploading the image may not know this. Therefore, the less superior image is uploaded to the collection of servers, and utilizing additional storage space of the collection of servers.

SUMMARY

Embodiments of the present invention disclose a method, computer program product, and computer system for managing media content. A computer receives, at a first memory storage location, a first file having one or more associated properties. The computer identifies, by one or more processors, a second file, at a second memory storage location, having one or more associated properties that are substantially similar to the first file. The computer compares, by one or more processors, the one or more properties of the first file to the one or more properties of the second file. The computer determines, by one or more processors, whether to replace the first file with the second file, based on the comparison of the one or more properties of the first file to the one or more properties of the second file. Responsive to determining to replace the first file with the second file, the computer stores at the first memory storage location a link to the second memory storage location.

DETAILED DESCRIPTION

Figure 1:
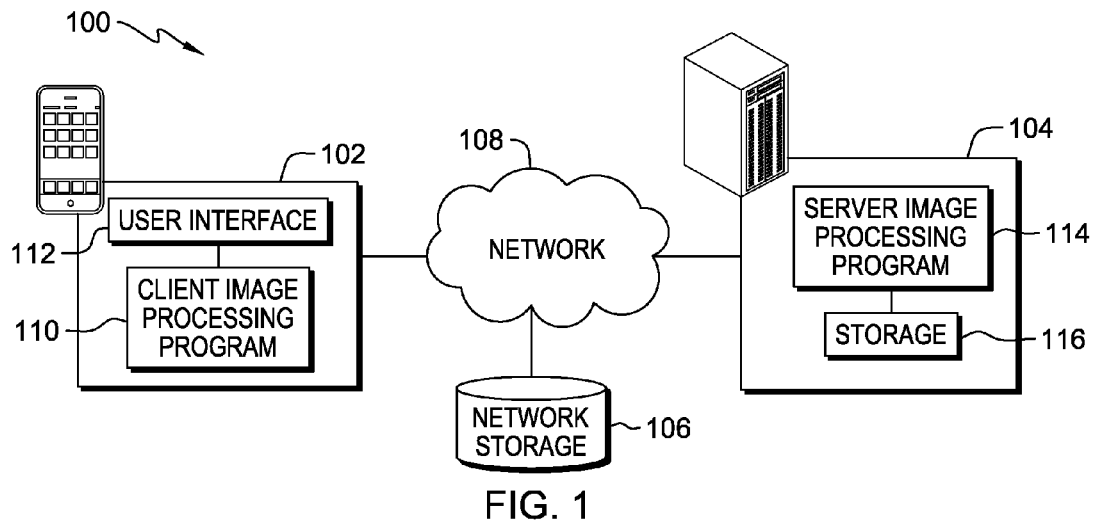
FIG. 1 is a functional block diagram illustrating a distributed data processing environment, in accordance with an embodiment of the present invention.

With cloud storage being prevalently used in the storage of digital media content, certain measures can be taken to reduce the amount of cloud storage being utilized. Embodiments of the present invention recognize that certain digital media content being uploaded to the cloud storage can be similar to other digital media content already in the cloud storage. For digital media content, such as an image, measures of similarity can include properties such as image quality, a location presented in the image, a time the image was taken, an image size, whether any people are present in the image, and, in some embodiments, the identities of people present in the image. Embodiments of the present invention have the ability to identify properties describing the image and store the identified properties in the form of metadata.

Embodiments of the present invention also have the ability to identify similar images based on each image's associated metadata. The metadata associated with an image can be used to compare how similar an image may be to another image in the cloud storage. Embodiments of the present invention provide the identified similar images as possible replacements for the image being uploaded to the cloud storage. Therefore, uploading a redundant or lower-quality image to the cloud storage can be avoided. Embodiments of the present invention can also identify if the image being uploaded to the cloud storage is superior to the similar images which already exist in the cloud storage. Embodiments of the present invention also have the ability to replace the inferior image in the cloud storage with the superior image being uploaded. The comparison of metadata associated with the image being uploaded and the images in storage can be used to determine which image is superior.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, generally designated 100, in accordance with one embodiment of the present invention. Distributed data processing environment 100 includes client device 102, server computer system 104, and network storage 106, all interconnected over network 108.

Client device 102 can be a laptop computer, a tablet computers, a netbook computer, a personal computer (PCs), a desktop computer, a personal digital assistant (PDA), a smartphone, or any other programmable electronic device capable of communicating with server computer system 104 via network 108. Client device 102 includes client image processing program 110, which has access to digital media content, such as image files, music files, and video files, stored on client device 102.

Client image processing program 110 can identify properties of each of the digital media content, for example, image files, through a series of operational steps. Client image processing program 110 can utilize other features, for example, programs of client device 102 by querying the programs to gather information to compile the properties of each of the image files. User interface 112 on client device 102 displays information that any one of the processes of client image processing program 110 may display to a user. User interface 112 can be, for example, a graphical user interface (GUI) or a web user interface (WUI) and can display text, documents, web browser windows, user options, application interfaces and instructions for operation.

Server computer system 104 may be a specialized computer server accessible to multiple client computers via network 108. In certain embodiments, server computer system 104 represents a computer system utilizing clustered computers and components communicating with each other through various connections and protocols to act as a single pool of seamless resources when accessed through network 108, as is common in data centers and with cloud computing applications. In general, server computer system 104 is representative of any programmable electronic device or combination of programmable electronic devices capable of executing machine-readable program instructions and communicating with other computing devices via a network, in accordance with embodiments of the invention.

Server computer system 104 may store, maintain, and provide various services, to clients such as client device 102. Server computer system 104 contains server image processing program 114 capable of identifying and providing similar image files as possible replacement to image files provided by client image processing program 110 of client device 102. Server image processing program 114 utilizes properties that client image processing program 110 identifies to identify if similar image files exist locally in storage 116 on server computer system 104 and/or in network storage 106. Network storage 106 can be a collection of storage units accessible by either client device 102 or server computer system 104.

In one embodiment, client device 102 may be owned, and at least nominally controlled (e.g., required to install various security software, updates, etc.) by the same entity controlling server computer system 104. In such an embodiment, client device 102 may be considered part of server computer system 104.

Network 108 can be any combination of connections and protocols that will support communications between server computer system 104, client computer 102, and network storage 106. Network 108 can include, for example, a local area network (LAN), a wide area network (WAN) such as the internet, a cellular network, or any combination of the preceding, and can further include wired, wireless, and/or fiber optic connections.

Figure 2:
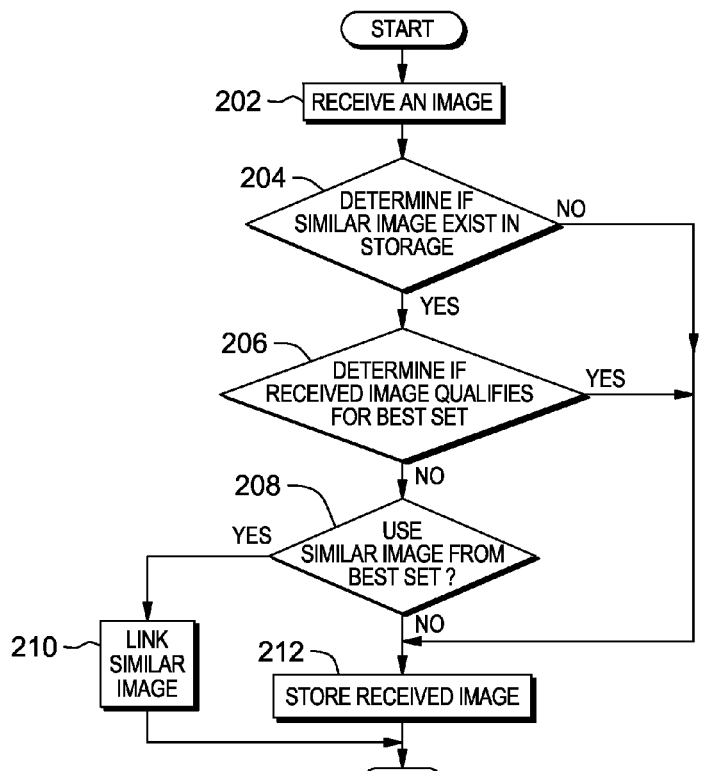
FIG. 2 is a flowchart depicting operational steps of an image processing program sorting received images, in accordance with an embodiment of the present invention.

FIG. 2 is a flowchart depicting operational steps of server image processing program 114 sorting received images, in accordance with an embodiment of the present invention.

Server image processing program 114 maintains a dedicated repository, for example, storage 116 for storing image files. The image files in storage 116 include corresponding metadata of each of the image files. Server image processing program 114 is capable of receiving image files, for example, from client device 102, and comparing the metadata of the received digital images to the metadata of similar digital images in storage 116 to identify the superior quality images. As a rule, the images in the dedicated repository are considered to be the current "best set" for a given image or set of images.

Server image processing program 114 receives an image (step 202). The image can be sent from an electronic device, for example, client device 102, capable of storing and sending images. In other embodiments, other types of digital media content can be sent, such as a music file or a video file. In an exemplary embodiment, the electronic device is a mobile phone sending an image file to another storage location, such as server computer system 104, over a network, such as network 108.

Server image processing program 114 determines if a similar image exists in storage, for example, storage 116 or network storage 106 (decision step 204). Similarities between images can be determined by evaluating properties of each of the images which are represented in the form of metadata in the images. Details on how properties of an image are compiled are described in further detail with respect to FIG. 3. The measure of similarity between images can be based on established thresholds of a number of similar properties of the received image, as compared to the images in storage. Details on the evaluation of properties of the image received to the images in storage are described in further detail with respect to FIG. 4. If server image processing program 114 determines that a similar image to the received image does not exist in storage (decision step 204, "No" branch), server image processing program 114 stores the received image (step 212).

If server processing image program 114 determines a similar image to the received image does exist in storage (decision step 204, "Yes" branch), then the server image processing program compares the received image to the identified similar images to determine if the received image qualifies for the best set of images (decision step 206). The metadata of the received image is compared to the metadata of the identified similar images. If server image processing program 114 determines the received image does qualify for the best set (decision step 206, "Yes" branch), then server image processing program 114 stores the received image (step 212).

If server image processing program 114 determines the received digital image does not qualify for the best set (decision step 206, "No" branch), server image processing program 114 can provide the identified similar images from storage as a replacement for the received image (decision step 208). In one embodiment, server image processing program 114 can display in a user interface, for example, user interface 112, the identified similar images from storage for the user to decide whether to use any of the similar images in place of the received image. If server image processing program 114 receives an input to not use any of the similar images from storage (decision step 208, "No" branch), server image processing program 114 stores the received image (step 212).

If server image processing program 114 receives an input to use an identified similar image from storage, (decision step 208, "Yes" branch), server image processing program 114 links the identified similar image in storage in place of the received image (step 210). Instead of using the received image, the similar image being linked can be used as a replacement. In doing so, server image processing program 114 does not allocate storage space for the received image to be stored and instead, uses the selected similar image while discarding the received image. Server image processing program 114 stores the similar image in one location, for example, storage 116 but links the similar image to multiple locations.

Figure 3:
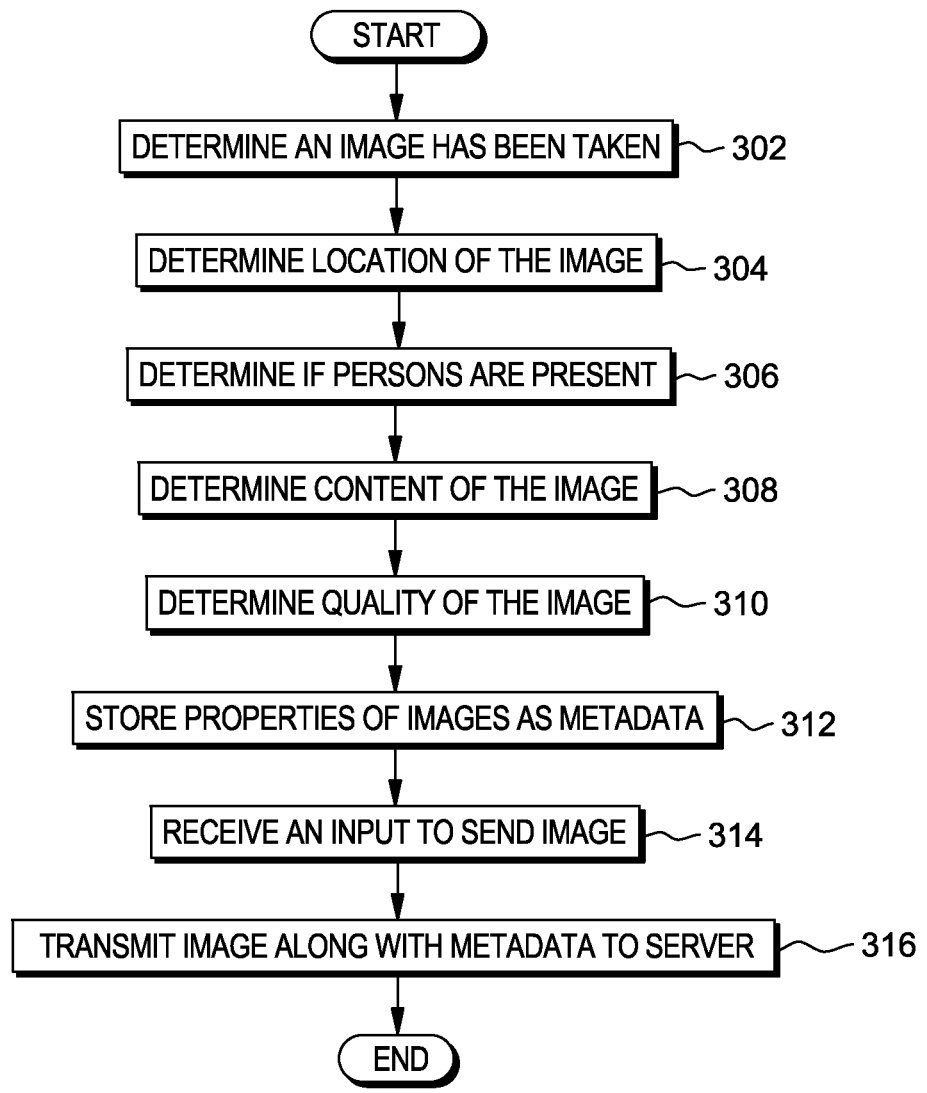
FIG. 3 is a flowchart depicting operational steps of the image processing program creating metadata describing properties of an image, in accordance with an embodiment of the present invention.

FIG. 3 is a flowchart depicting operational steps of client image processing program 110 creating metadata of an image, in accordance with an embodiment of the present invention.

Client image processing program 110 has the ability of detecting when digital media content is created on client 102. In an exemplary embodiment, the digital media content being created is an image taken with a mobile phone camera, such as a camera on client device 102. The user of the client device 102 can be at a location, such as a concert and can be taking a photo, for example a digital image, of the concert. In other embodiments, the digital media content file being created is a video file or an audio file recorded with client device 102.

Client image processing program 110 determines an image has been taken (step 302). Client image processing program 110 can work in conjunction with the client device 102 image taking program to determine if an image has been taken. In one embodiment, client image processing program 110 can determine an image has been taken when the user saves an image just taken, to the local memory on the client device 102. If the user does not save the image just taken with the client device 102 to the local memory, client image processing program 110 does not proceed with the further operational steps.

Client image processing program 110 determines the location of where the image was taken (step 304). In one embodiment, the location of where the image was taken can be determined by querying other features of the client device 102 taking the image. Such features can include applications stored on the client device 102 capable of determining the location of the client device 102. For example, client image processing program 110 can query an application on the client device 102 for the global positioning system (GPS) location of the client device 102 and can store the GPS location as the location at which the image was taken.

In another example, client image processing program 110 can query a social network application on the client device 102 of the client. The social network application can contain a list of dates, times and locations the user has manually entered or has been previously determined by the application. Client image processing program 110 can access the information from the social network application and associate the information with the image which was taken.

Client image processing program 110 determines if people are present in the image (step 306). In an exemplary embodiment, client image processing program 110 can utilize face recognition software to determine if any people are present in the image. Furthermore, client image processing program 110 can contain a list of popular people (e.g., celebrities and political figures) and/or a list of people the client has pre-programmed into client image processing program 110. Client image processing program 110 can reference the list of people to determine if any of the people from the list are identified in the image. If the person in the image is present on the list of people, client image processing program 110 tags the identified person in the photo. Tagging the identified person can include storing the name of the indentified person as a property of the photo in the form of metadata.

Client image processing program 110 determines the content of the image (step 308). In an exemplary embodiment, the content of the image refers to the details of the image displayed in the photo. For example, if client image processing program 110 determines the location of where an image was take to be near The White House, client image processing program 110 can determine the possible content of the image to be "The White House." Upon which, client image processing program 110 stores the possible content determination as a property of the image in the form of metadata.

In another example, client image processing program 110 receives an image of a musical artist at a concert the user was attending. Client image processing program 110 determines an identified person in the received image to be a musical artist from the list of pre-determined people (see step 306). Client image processing program 110 also determines the location, date and time the image was taken. Client image processing program 110 can use an internet search engine to query for information of possible events with the identified musical artist at the determined time and location. If client image processing program 110 determines a concert was occurring at the time and location the image was taken, and the concert was that of the identified musical artist, client image processing program 110 determines the possible content as being the musical artist at the determined location and time. Upon which, client image processing program 110 stores the possible content determination as a property in the metadata for the image.

Client image processing program 110 determines the quality of the image (step 310). Client image processing program 110 can utilize a feature on client device 102, such as an image analyzing program, to determine various characteristics of the image. An example of a characteristic is the size of the image compared to the storage size of the image. Client image processing program 110 can obtain such information from the mobile phone image taking program. Client image processing program 110 can store the storage size (e.g., megabyte size) of the image along with the size of the image in pixel by pixel format. In another example, the image analyzing program can be queried to determine the clarity of the image taken. The image analyzing program can determine the clarity or the sharpness of the photo taken and can send the information to client image processing program 110. Client image processing program 110 utilizes the determined quality of the image as a measure of whether an image qualifies for a best set, and is described in further detail with respect to FIG. 4.

Client image processing program 110 stores the properties of the image as metadata (step 312). The properties of the image are stored in the form of metadata which is associated with the image. The image along with metadata describing the properties of the image is stored on the local storage of the client device 102. The image along with the associated metadata is stored until an input is received by the user to send the image with the associate properties to an external storage, not located on the client device 102.

Client image processing program 110 receives an input to send the image to the server (step 314). In one embodiment, the user of the client device 102 may want to send the image taken to a different location. For example, the different location can be another storage location other than the local storage on the client device 102 or an internet webpage capable of hosting received images. The user can utilize a user input device to communicate with client image processing program 110 to send the image taken to a different location. In another embodiment, client image processing program 110 can automatically determine to send the taken picture to a different location from the local storage of the client device 102. In one example, client image processing program 110 can be programmed by the user to backup any images taken with the client device 102 on a cloud based storage system. Having set the associated user preferences, client image processing program 110 does not have to receive an input from the user to send the image taken to a different location since. Client image processing program 110 can automatically determine that the image and the associated properties included in the metadata need to be sent to the different location.

Client image processing program 110 transmits the image along with the metadata to the server (step 316). Subsequent to receiving an input to send the image or determining to automatically send the image, client image processing program 110 transmits the image and metadata to the different location. In this embodiment, the different location being discussed is server computer system 104. Client image processing program 110 can send the image and metadata via network 108 to server computer system 104.

Figure 4:
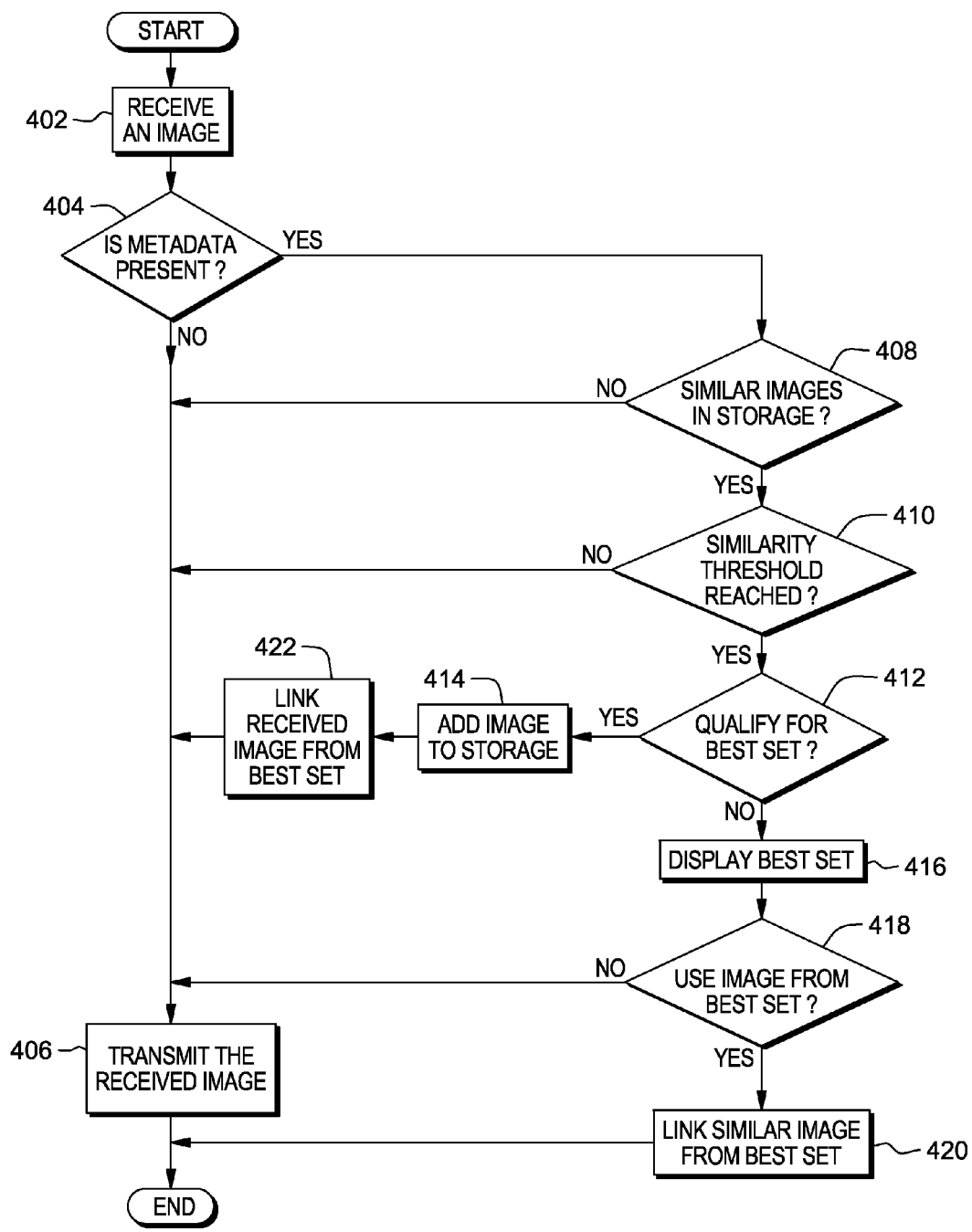
FIG. 4 is a flowchart depicting operational steps of the image processing program sorting received images according to the metadata describing properties of the image, in accordance with an embodiment of the present invention.

FIG. 4 is a flowchart depicting operational steps of server image processing program 114 sorting images that have been received, using the metadata of the image, in accordance with an embodiment of the present invention.

Server image processing program 114 receives the image (step 402). The image, sent from the client device 102 includes any associated metadata. Server image processing program 114 receives the image prior to it being stored in storage.

Server image processing program 114 determines if metadata is present (decision step 404). If server image processing program 114 determines there is no metadata received (decision step 404, "No" branch), server image processing program 114 transmits the received image to the different location (step 406). If no metadata is present with the image received, server image processing program 114 has no properties associated with the image with which it can compare the image received with the images already in the storage, and the received image is transmitted to the different location. Server image processing program 114 allocates storage space for the image received, stores the image, after which the image is made available to other applications, for example, an internet webpage such as a file sharing website, a file hosting website or a social networking website capable of displaying images.

If the received image includes metadata (decision step 404, "Yes" branch), server image processing program 114 determines if there are similar images in storage (decision step 408). In this embodiment, server image processing program 114 determines if the received image is similar to another image that exists in storage containing similar metadata. If server image processing program 114 determines that there are no similar images in storage (decision step 408, "No" branch), server image processing program 114 transmits the received image to the different location (step 406).

If server image processing program 114 determines there are similar images in storage (decision step 408, "Yes" branch), server image processing program 114 compiles a list of images in storage with similar metadata to the image received. Since server image processing program 110 previously determined the received image contained associated metadata, the properties are going to be used to identify similar images.

In one example, a similar property can be a location of where the image was taken. The location property of the received image is compared to the location property of the images in storage and the images with the same location are identified as possibly being similar to the image received. In another example, a similar property can be a person identified in the image received. If there is another image in storage with the person identified in the received image, the other image in storage is deemed as being possibly similar to the image received. Server image processing program 114 can identify similar images according to each property of the received image. Any similar image identified multiple times due to having multiple properties similar to the image received, server image processing program 114 temporarily stories the count of similar properties for each of the identified similar images.

Server image processing program 114 determines if a similarity threshold has been reached between the received image and any of the similar images existing in storage (decision step 410). If server image processing program 114 determines the similarity threshold has not been reached (decision step 410, "No" branch), server image processing program 114 transmits the received image to the different location (step 406). If server image processing program 114 determines the similarity threshold has been reached (decision step 410, "Yes" branch), the similar image from storage remains on a list of possible similar images.

The similarity threshold can be established by a user of server image processing program 114 prior to receiving the image. In one embodiment, the similarity threshold can be a number of similar properties identified with an image in storage. For example, if an image in storage has only one similar property when compared to the received image, server image processing program 114 can deem the image in storage as not being similar enough. If the similarity threshold requires three similar properties with the received image, and an image in storage has three or more similar properties to the received image, server image processing program 114 deems the image in storage similar enough to the received image. In another embodiment, the similarity threshold can be a percentage of the number of similar properties to the number of non-similar properties. If the percentage is above the threshold, server image processing program 114 can deem the image in storage as being similar enough and if the percentage is below the threshold, server image processing program 114 can deem the image in storage as not being similar enough.

Server image processing program 114 determines if the received image qualifies for the best set (decision step 412). Using the properties of the received image, server image processing program 114 can determine if the received image qualifies for the best set. Since there can be multiple properties describing an image, there can be a best set of images for each of the multiple properties. However, a best set of images can also exist for a combination of available properties server image processing program 114 can identify in received images. If server image processing program 114 determines the received image does qualify for the best set (decision step 412, "Yes" branch), server image processing program 114 stores the image to the best set. If server image processing program 114 determines the received image does not qualify for the best set (decision step 412, "No" branch), server image processing program 114 allows for the user to possibly select an image from the best set to use in place of the received image.

In one embodiment, as previously mentioned, a best set can exist for every available property which server image processing program 114 can identify in an image received. For example, a property of an image can be a geographical location such as The White House. If the image server imaging processing program 114 receives contains a geographical location property as being The White House, server image processing program 114 compares the image received to existing best set of images in storage with the same geographical location property, for example The White House.

In another embodiment, as previously mentioned, a best set can exist for a combination of available properties which server image processing program 114 can identify in an image received. For example, a best set of images can exist for a combination of two properties. One property of an image can be a geographical location, such as The White House and the second property can be an identified person, such as The President. If the image received by server imaging processing program 114 contains both properties of The White House, for location, and The President, for person or people, server image processing program 114 compares the image received to existing best set of images in storage with both proprieties, rather than comparing the image to the best set of each of the respective properties.

Server image processing program 114 can utilize an image analyzing program to determine whether the image received is superior to the best set of images in storage. Server image processing program 114 can identify the clarity of the image based on the sharpness of edges in the image received. If the image received has a geographical location property of The White House, and contains sharper edges, server image processing program 114 can deem the received images as being superior to the best set images and can store the image as part of the best set of images for the geographical location property being evaluated.

Server image processing program 114 can identify the directional orientation of the image received as compared to the best set of images in storage. Utilizing information previously determined and stored as a property by client image processing program 110, server image processing program 114 can use the internal compass of the client device 102 to determine the directional orientation (e.g., North) of the camera to see if the orientation of the received image is similar to the directional orientation of the best set of images. Though the geographical location property of the received image can be the same as the best set of images, the directional orientation of the received image can be different thus not being similar to the images in the best set.

Server image processing program 114 can also store multiple best sets of images to each property or each combination of properties. In one example, the multiple best sets can have a limitation such as an image size. Server image processing program can have multiple best sets based on the image size of the received image determined by a pixel by pixel size of each image. Server image processing program 114 can be pre-programmable by the user to set pixel by pixel size limitations for each of the best set of the multiple best sets. Small, medium, large sized images can be limited by the pixel by pixel size and correspond to multiple best sets for each property or each combination of properties.

Server image processing program 114 can also give different weight to each of the properties, thus affecting whether or not an image qualifies for a best set of images. The weight of each of the properties can be pre-programmed into server image processing program 114. In an example, server image processing program 114 may weigh image clarity more than the image size. So if server image processing program 114 receives an image with clarity that exceeds the clarity of any image in storage but the image size does not fall into any best set of images with a size limitation, server image processing program 114 still stores the image. Server image processing program 114 can store the image under the closest best set of images with the size limitation or server image processing program 114 can create a miscellaneous best set of images where there is no limitation on image size.

Server image processing program 114 adds the received image to storage (step 414). Upon determining the received image qualifies for at least one best set of images, server image processing program 114 stores the received image in storage. Server image processing program 114 can store the image received once but can associate the image with multiple best sets having different identifiable properties. From the previous example mentioned in the discussion of decision step 412, server image processing program 114 can add the received image to storage and associate the image with the best set of images of a location, for example, The White House and a best set of images of an identified person, for example, The President. In another example, server image processing program 114 can replace an image previously stored in a best set with the image received. A memory storage location of the previously stored image becomes a memory storage location of the received image. As a result, any previously established links to the image previously stored, now link to the received image which replaced the stored image.

Server image processing program 114 links the received image from the best set in storage (step 422). In one embodiment, server image processing program 114 can utilize a link to the selected received image previously added to storage in step 414. In this example, server image processing program 114 transmits the received image (step 406) in the form of a link to a memory storage location of the received image. The link can be in the form of the actual picture, wherein selecting to view the picture, links a user to the location of where the original similar image is being stored, for example, the server. In another embodiment, the similar image is downloadable to the location of where the received image was designated.

If server image processing program 114 determines the received image does not qualify to be add to storage as part of a best set of images, server image processing program 114 displays the best set of images for the user to use in place of the received image (step 416). In one embodiment, server image processing program 114 can display every similar image which has met the similarity threshold in decision step 410.

Server image processing program 114 determines whether or not to use a similar image from the best set of images (decision step 418). If server image processing program 114 determines not to use a similar image from the best set of images (decision step 418, "No" branch), server image processing program transmits the received image to the different location (step 406). If server image processing program 114 determines to use a similar image from the best set of images (decision step 418, "Yes" branch), the similar image from the best set of images replaces the received image.

Server image processing program 114 links the similar image from the best set in place of the received image (step 420). For example, server image processing program 114 can store at a memory storage location of the received image a link to a memory storage location of the similar image. In one embodiment, server image processing program 114 can transmit a link to the different location where the received image was designated, wherein the link is to a memory storage location of the similar image. The link can be in the form of the actual picture, wherein selecting to view the picture, links a user to the location of where the original similar image is being stored, for example, the server. By linking the image, the image is stored once in the server and sourced to multiple locations. In another embodiment, the similar image is downloadable to the location of where the received image was designated. The similar image can be sent from the server and stored at the different location for it to be utilized.

Figure 5:
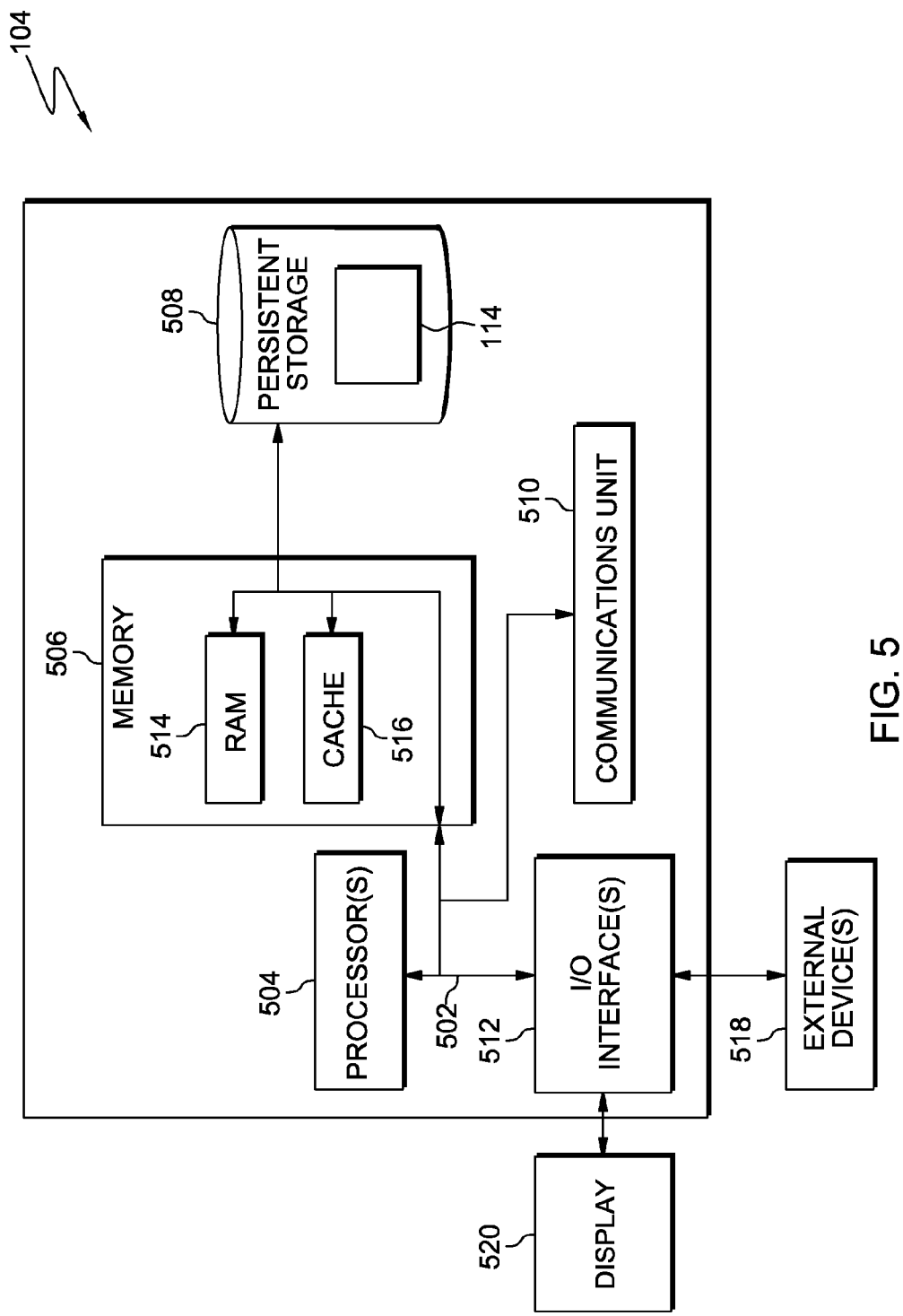
FIG. 5 depicts a block diagram of components of the computer device executing the service migration program, in accordance with an embodiment of the present invention.

FIG. 5 depicts a block diagram of components of a computer 500, capable of operating client image processing program 110 and server image processing program 114 within client device 102 and server computer system 104 respectively, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Client image processing program 110 and server image processing program 114 are stored respectively in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

In these examples, communications unit 510 includes one or more network interface cards. Communications unit 510 may provide communications through the use of either or both physical and wireless communications links. Client image processing program 110 and server image processing program 114 may be downloaded respectively to persistent storage 508 through communications unit 510.

I/O interface(s) 512 allows for input and output of data with other devices that may be connected to client device 102 or server computer system 104. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g. client image processing program 110 and server image processing program 114, can be stored respectively on such portable computer-readable storage media and can be loaded onto persistent storage 508 via I/O interface(s) 512. I/O interface(s) 512 may also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing media content, the method comprising:
   receiving, at a first memory storage location, a first file having a first plurality of associated descriptive properties, wherein one of the first plurality of associated descriptive properties of the first file includes a first measure of sharpness representing clarity of visual content in the first file;
   identifying, by one or more processors, a second file having a second plurality of associated descriptive properties and visual content similar to the visual content of the first file based on geographical location, directional orientation, and image size, wherein one of the second plurality of associated descriptive properties of the second file includes a second measure of sharpness representing clarity of the visual content in the second file;
   determining, by one or more processors, whether to replace the first file with the second file, based on at least a comparison of the first measure of sharpness representing clarity of visual content in the first file and the second measure of sharpness representing clarity of visual content in the second file; and
   responsive to determining to replace the first file with the second file, storing at the first memory storage location a link to the second memory storage location.

2. The method of claim 1, further comprising:
   responsive to determining not to replace the first file with the second file, replacing the second file with the first file at the second memory storage location; and
   storing at the first memory storage location a link to the first file at the second memory storage location.

3. The method of claim 1, wherein determining whether to replace the first file with the second file further comprises:
   determining, by one or more processors, a comparison threshold has been reached, the comparison threshold being one of: a predetermined number of associated descriptive properties of the second file being superior to associated descriptive properties of the first file; or a predetermined percentage of associated descriptive properties of the second file being superior to associated descriptive properties of the first file.

4. The method of claim 1, further comprising:
   receiving an input to store, at the first memory storage location, a link to the second memory storage location; and
   responsive to receiving the input, storing at the first memory storage location a link to the second memory storage location.

5. The method of claim 2, wherein determining not to replace the first file with the second file further comprises:
   determining, by one or more processors, a comparison threshold has not been reached, the comparison threshold being one of: a predetermined number of associated descriptive properties of the second file being superior to associated descriptive properties of the first file; or a predetermined percentage of associated descriptive properties of the second file being superior to associated descriptive properties of the first file.

6. A computer program product for managing media content, the computer program product comprising:
   one or more computer readable storage media;
   program instructions stored on the one or more computer readable storage media, which when executed by one or more processors, cause the one or more processors to:
   receive, at a first memory storage location, a first file having a first plurality of associated descriptive properties, wherein one of the first plurality of associated descriptive properties of the first file includes a first measure of sharpness representing clarity of visual content in the first file;
   identify, a second file having a plurality of associated descriptive values and visual content similar to the visual content of the first file based on geographical location, directional orientation, and image size, wherein one of the second plurality of associated descriptive properties of the second file include a second measure of sharpness representing clarity of the visual content in the second file;
   determine, whether to replace the first file with the second file, based on at least a comparison of the first measure of sharpness representing clarity of visual content in the first file; and
   responsive to determining to replace the first file with the second file, store at the first memory storage location a link to the second memory storage location.

7. The computer program product of claim 6, further comprising program instructions, stored on the one or more computer readable storage media, which when executed by a processor, cause the processor to:
   responsive to determining not to replace the first file with the second file, replace the second file with the first file at the second memory storage location; and
   storing at the first memory storage location a link to the first file at the second memory storage location.

8. The computer program product of claim 6, wherein determining whether to replace the first file with the second file further comprises program instructions, stored on the one or more computer readable storage media, which when executed by a processor, cause the processor to:
- determine, a comparison threshold has been reached, the comparison threshold being one of: a predetermined number of associated descriptive properties of the second file being superior to associated descriptive properties of the first file; or a predetermined percentage of associated descriptive properties of the second file being superior to associated descriptive properties of the first file.

9. The computer program product of claim 6, further comprising program instructions, stored on the one or more computer readable storage media, which when executed by a processor, cause the processor to:
- receive an input to store, at the first memory storage location a link to the second memory storage location; and
- responsive to receiving the input, store at the first memory storage location a link to the second memory storage location.

10. The computer program product of claim 7, wherein determining not to replace the first file with the second file further comprises program instructions, stored on the one or more computer readable storage media, which when executed by a processor, to:
- determining, by one or more processors, a comparison threshold has not been reached, the comparison threshold being one of: a predetermined number of associated descriptive properties of the second file being superior to associated descriptive properties of the first file; or a predetermined percentage of associated descriptive properties of the second file being superior to associated descriptive properties of the first file.

11. A computer system for managing media content, the computer system comprising:
- one or more computer processors;
- one or more computer readable storage media;
- program instructions stored on the one or more computer readable storage media, for execution by at least one of the one or more computer processors, which when executed, cause the processor to:
- receive, at a first memory storage location, a first file having a first plurality of associated descriptive properties, wherein one of the first plurality of associated descriptive properties of the first file includes a first measure of sharpness representing clarity of visual content in the first file;
- identify, a second file having a plurality of associated descriptive values and visual content similar to the visual content of the first file based on geographical location, directional orientation, and image size, wherein one of the second plurality of associated descriptive properties of the second file include a second measure of sharpness representing clarity of the visual content in the second file;
- determine, whether to replace the first file with the second file, based on at least a comparison of the first measure of sharpness representing clarity of visual content in the first file and the second measure of sharpness representing clarity of visual content in the second file; and
- responsive to determining to replace the first file with the second file, store at the first memory storage location a link to the second memory storage location.

12. The computer system of claim 11, further comprising program instructions, stored on the one or more computer readable storage media, which when executed by a processor, cause the processor to:
- responsive to determining not to replace the first file with the second file, replace the second file with the first file at the second memory storage location; and
- storing at the first memory storage location a link to the first file at the second memory storage location.

13. The computer system of claim 11, wherein determining whether to replace the first file with the second file further comprises program instructions, stored on the one or more computer readable storage media, which when executed by a processor, cause the processor to:
- determine, a comparison threshold has been reached, the comparison threshold being one of: a predetermined number of associated descriptive properties of the second file being superior to associated descriptive properties of the first file; or a predetermined percentage of associated descriptive properties of the second file being superior to associated descriptive properties of the first file.

14. The computer system of claim 11, further comprising program instructions, stored on the one or more computer readable storage media, which when executed by a processor, cause the processor to:
- receive an input to store, at the first memory storage location a link to the second memory storage location; and
- responsive to receiving the input, store at the first memory storage location a link to the second memory storage location.

15. The computer system of claim 12, wherein determining not to replace the first file with the second file further comprises program instructions, stored on the one or more computer readable storage media, which when executed by a processor, cause the processor to:
- determining, by one or more processors, a comparison threshold has not been reached, the comparison threshold being one of: a predetermined number of associated descriptive properties of the second file being superior to associated descriptive properties of the first file; or a predetermined percentage of associated descriptive properties of the second file being superior to associated descriptive properties of the first file.

* * * * *